United States Patent
Roussel et al.

(10) Patent No.: US 9,615,244 B2
(45) Date of Patent: Apr. 4, 2017

(54) METHOD FOR ACCESSING A SERVICE AND A CORRESPONDING DEVICE

(71) Applicant: GEMALTO SA, Meudon (FR)

(72) Inventors: Nicolas Roussel, Gemenos (FR);
Nicolas Joubert, Gemenos (FR);
Florent Labourie, Gemenos (FR);
Jérôme Duprez, Gemenos (FR);
Frédéric Faure, Gemenos (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 15/107,412

(22) PCT Filed: Dec. 17, 2014

(86) PCT No.: PCT/EP2014/078270
§ 371 (c)(1),
(2) Date: Jun. 22, 2016

(87) PCT Pub. No.: WO2015/097042
PCT Pub. Date: Jul. 2, 2015

(65) Prior Publication Data
US 2017/0006464 A1    Jan. 5, 2017

(30) Foreign Application Priority Data
Dec. 23, 2013 (EP) .................................... 13306844

(51) Int. Cl.
*H04W 8/20* (2009.01)
*H04L 29/08* (2006.01)
(Continued)

(52) U.S. Cl.
CPC ............ *H04W 8/20* (2013.01); *H04B 1/3816* (2013.01); *H04L 67/02* (2013.01)

(58) Field of Classification Search
CPC ......... H04W 8/20; H04L 67/02; H04B 1/3816
See application file for complete search history.

(56) References Cited

U.S. PATENT DOCUMENTS 8,185,156 B2 * 5/2012 Camilleri ............... H04W 8/183
455/428
8,488,787 B2 * 7/2013 Charbonnier ....... H04L 63/0823
380/200
(Continued)

FOREIGN PATENT DOCUMENTS

EP        2 461 613 A1     6/2012
WO    WO2012/076461 A1    6/2012

OTHER PUBLICATIONS

International Search Report (PCT/ISA/210) mailed on Mar. 5, 2015, by the European Patent Office as the International Searching Authority for International Application No. PCT/EP2014/078270.
(Continued)

*Primary Examiner* — Brandon Miller
(74) *Attorney, Agent, or Firm* — Buchanan Ingersoll & Rooney PC

(57) ABSTRACT

A first device stores a subscription manager and at least two subscriptions. A first subscription is active and a second subscription is non-active. A second device sends a request for switching to the second subscription. The subscription manager sets a first variable relating to a next active subscription to the second subscription. The subscription manager sends to the first device a message requesting the first device to re-launch an execution of the subscription manager and to read data. The first device sends to the subscription manager a message including a command for re-launching an execution of the subscription manager. The subscription manager de-activates, based upon the first variable value, the first subscription. The subscription manager activates, based upon the first variable value, the second subscription, and sends to the first device operating system data relating to the second subscription, as a current active subscription.

10 Claims, 1 Drawing Sheet

(51) Int. Cl.
    *H04B 1/38*    (2015.01)
    *H04B 1/3816*  (2015.01)

(56) References Cited

U.S. PATENT DOCUMENTS

| | | | |
|---|---|---|---|
| 8,744,406 B2* | 6/2014 | Ennesser .............. | G06F 21/606 |
| | | | 455/410 |
| 9,100,918 B2* | 8/2015 | Ruvalcaba ........ | H04W 52/0241 |
| 9,361,470 B2* | 6/2016 | Berard .................... | G06F 21/62 |
| 2004/0192386 A1* | 9/2004 | Aerrabotu ............ | H04M 15/00 |
| | | | 455/558 |
| 2010/0222104 A1* | 9/2010 | Lee ..................... | H04B 1/3816 |
| | | | 455/558 |
| 2012/0122423 A1 | 5/2012 | Helmreich | |
| 2015/0134958 A1 | 5/2015 | Merrien et al. | |

OTHER PUBLICATIONS

Written Opinion (PCT/ISA/237) mailed on Mar. 5, 2015, by the European Patent Office as the International Searching Authority for International Application No. PCT/EP2014/078270.

* cited by examiner

METHOD FOR ACCESSING A SERVICE AND A CORRESPONDING DEVICE

FIELD OF THE INVENTION

The invention relates generally to a method for accessing a service.

Moreover, the invention pertains to a first device for accessing a service.

The first device may be a terminal, like notably a mobile (tele)phone.

The present invention is notably applicable to a mobile radio-communication field wherein a chip may be either an embedded chip, such as an embedded Universal Integrated Circuit Card (or eUICC) or a chip that is included within a smart card termed Subscribed Identity Module (or SIM) type card or the like, as a secure element.

Within the present description, a Secure Element (or SE) is a smart object that, on the one hand, protects access to data that the smart object stores and, on the other hand, is intended to communicate with the outside world.

STATE OF THE ART

As known per se, a mobile phone, as a user terminal, cooperates with an SE, so as to identify and authenticate a subscriber to a mobile radio-communication network. To identify and authenticate the subscriber, the SE provides the mobile radio-communication network with data relating to a user subscription.

WO2012/076461 and EP 2 461 613 A1 describe a technique for switching from a first to a second (logical) subscription within one and the same UICC, as a secure element.

However, such a switch is transparent to a UICC hosting terminal. It may be that the terminal has one active subscription and the UICC has another active subscription. It results that the terminal is in a blocked state when the two different subscriptions are not related to one and the same mobile radio-communication network. Such a blocked state implies a loss of network connectivity which is disturbing for the terminal user. To exit such a blocked state, it requires a manual reboot of the terminal equipment, so as to synchronize the terminal and the hosted UICC.

SUMMARY OF THE INVENTION

The invention proposes a solution for solving the just herein above specified problem by providing a method for accessing a service.

According to the invention, a first device accesses data storing means. The data storing means stores at least two subscriptions. A first subscription is active. At least one second subscription is non-active. The method includes the following steps. A second device sends to a subscription manager a request for switching to the second subscription, as a subscription to be activated. The subscription manager includes a first variable relating to a next active subscription. The subscription manager sets the first variable to the second subscription. The subscription manager sends to the first device operating system a message for requesting the first device operating system to re-launch an execution of the subscription manager and to read data. The first device operating system sends to the subscription manager a message including a command for re-launching an execution of the subscription manager. The subscription manager de- activates, based upon the first variable value, the first subscription. The subscription manager activates, based upon the first variable value, the second subscription. And the subscription manager sends to the first device operating system data relating to the second subscription, as a current active subscription.

The principle of the invention consists in that, as soon as a subscription manager receives from a requester, as a second device, a request to swap to an identified subscription, the subscription manager:

updates, by using the identified subscription, a first variable corresponding to a next active subscription;
 requests the first device Operating System (or OS) to fetch data;
 activates, once re-launched, only the identified subscription by using the first variable; and
 transmits to the first device OS data relating to the identified subscription.

The invention solution allows synchronizing automatically a switch from a first to a second subscription between the subscription manager and the first device OS. In other words, the first device OS and the subscription manager share data relating to the subscription which the subscription manager has switched to.

Contrary to the known solution, due to a consistency of the subscription, there is no blocked state issue and no network connectivity loss issue.

Contrary to the known solution, due to an automatic processing of the switch to the identified subscription, the invention solution requires no human intervention to synchronize the SIM type application and the first device.

The invention solution does not require any additional memory space than the one that is used to store the data relating to the subscriptions, irrespective of their respective state, either active or non-active.

It is to be noted that the subscription manager is supported at a client side, i.e. by either the first device itself or another device, as a third device. In other words, the first device OS may exchange with either the first device subscription manager or a third device subscription manager.

According to a further aspect, the invention is a first device for accessing a service.

According to the invention, a first device comprises data storing means. The data storing means stores a subscription manager. The data storing means stores at least two subscriptions. A first subscription is active. At least one second subscription is non-active. The subscription manager is configured to receive a request for switching to the second subscription, as a subscription to be activated. The subscription manager includes a first variable relating to a next active subscription. The subscription manager is configured to set the first variable to the second subscription. The subscription manager is configured to send to the first device operating system a message for requesting the first device operating system to re-launch an execution of the subscription manager and to read data. The subscription manager is configured to receive a message including a command for re-launching an execution of the subscription manager. The subscription manager is configured to de-activate, based upon the first variable value, the first subscription, to activate, based upon the first variable value, the second subscription and to send to the first device operating system data relating to the second subscription, as a current active subscription.

The first device may be a terminal.

According to still an additional aspect, the invention is a system for accessing a service. According to the invention, the system comprises a first device and a chip coupled or connected to the first device. The chip comprises data storing means. The data storing means stores a subscription manager. The data storing means stores at least two subscriptions. A first subscription is active. At least one second subscription is non-active. The subscription manager is configured to receive a request for switching to the second subscription, as a subscription to be activated. The subscription manager includes a first variable relating to a next active subscription. The subscription manager is configured to set the first variable to the second subscription. The subscription manager is configured to send to the first device operating system a message for requesting the first device operating system to re-launch an execution of the subscription manager and to read data. The subscription manager is configured to receive a message including a command for re-launching an execution of the subscription manager. The subscription manager is configured to de-activate, based upon the first variable value, the first subscription, to activate, based upon the first variable value, the second subscription and to send to the first device operating system data relating to the second subscription, as a current active subscription.

The chip may be either fixed to or removable from the first device.

The chip may be included within a secure element. The invention does not impose any constraint as to a kind of the secure element type.

As a removable secure element, it may be a SIM type card, a Secure Removable Module (or SRM), a smart dongle of the USB (acronym for "Universal Serial Bus") type, a (micro-) Secure Digital (or SD) type card or a Multi-Media type Card (or MMC) or any format card to be coupled to a host device, as a first device.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

Herein under is considered a case in which the invention method for accessing a service is implemented by a mobile phone, as a first device and a chip host device, a remote server, as a second device, and a chip, as a third device, that is fixed to the phone.

According to another embodiment, the invention method for accessing a service is implemented by a mobile phone, as a first device and a standalone entity, and a remote server, as a second device. In other words, the phone, as a user terminal, does not cooperate with any chip, so as to synchronize, between a subscription manager supported by the phone and the phone OS, data relating to a subscription that is active after a subscription switch. According to such an embodiment (not represented), the first device is adapted to carry out the functions that are carried out by the chip and the first device and that are described infra.

Naturally, the herein below described embodiment is only for exemplifying purposes and is not considered to reduce the scope of the invention.

Figure 1:
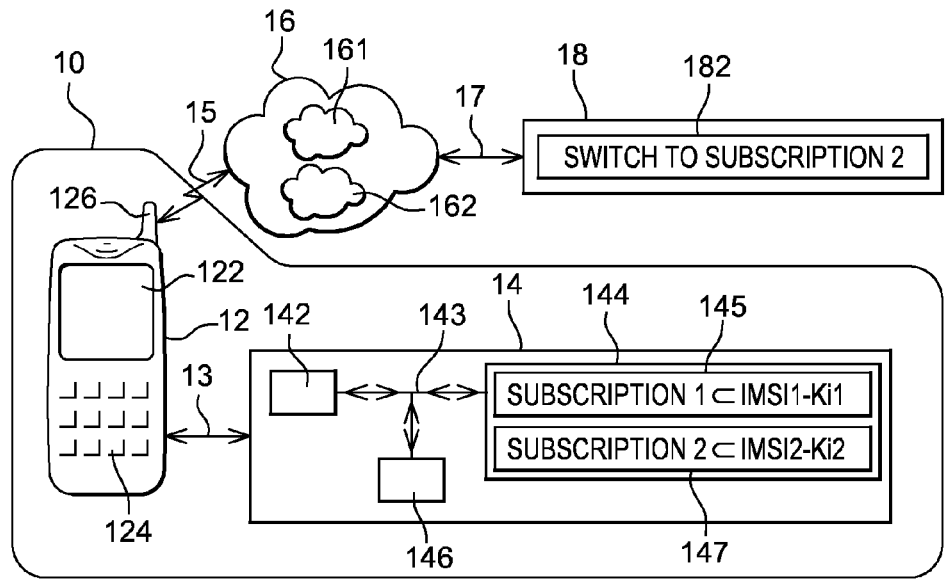
FIG. 1 illustrates a simplified diagram of a remote server and one embodiment of a terminal equipment, the terminal equipment being internally arranged to synchronize data relating to a subscription which the server requests to switch to, according to the invention.

FIG. 1 shows schematically a terminal equipment 10, as a system for accessing a service, that is connected to a remote server 18.

Such a system for accessing a service includes a mobile phone 12, as a user terminal, and a UICC 14.

For sake of simplicity, the mobile phone 12, the UICC 14 and the remote server 18 are termed herein after the phone 12, the chip 14 and the server 18 respectively.

Only one terminal is represented for clarity reason. However, the server 18 is able to provide a fleet of terminals/chips with a request for switching to a subscription to be activated.

Instead of a phone, it may be any other device including means for processing data, comprising or being connected to wireless communication means for exchanging data with outside, and comprising or being connected to means for storing data.

Within the present description, the adjective "wireless" used within the expression "wireless communication means" denotes notably that the communication means communicates via one or several Long Range (or LR) Radio-Frequency (or RF) links.

The LR RF may be fixed at several hundreds of MHz, for instance, around 850, 900, 1800, 1900 and/or 2100 MHz.

Instead of being constituted by a phone, the chip host device may be, for instance, a set-up box, a desktop computer, a laptop computer, a media-player, a game console, a tablet, a netbook, a handset and/or a Personal Digital Assistance (or PDA) that incorporates preferably or cooperates with a baseband radio processor. The baseband radio processor manages radio functions in cooperation with an antenna for communicating, Over-The-Air (or OTA), with another entity, like the server 18.

Such a chip host device set is not exhaustive but only for exemplifying purposes.

The phone 12 is preferably used for accessing one or several mobile radio-communication networks 16.

The mobile radio-communication networks 16 may be constituted by a Global Service for Mobiles (or GSM), a General Packet Radio Service (or GPRS), a Universal Mobile Telecommunications System (or UMTS), a UTRAN (acronym for "UMTS Terrestrial Radio Access Network"), an EDGE (acronym for "Enhanced Data Rates for GSM Evolution"), a Code Division Multiple Access (or CDMA), a WLAN (acronym for "Wide Local Area Network") and/or a Long Term Evolution (or LTE) type network(s).

Such a mobile radio-communication network set is not exhaustive but only for exemplifying purposes.

The phone 12 includes preferably a display screen 122 and a keyboard 124, as Man Machine Interface (or MMI).

Alternatively, instead of a physical keyboard separated from the display screen, the phone 12 is equipped with a touch sensitive display screen, as virtual keyboard.

The MMI allows a phone user to interact with the phone 12.

The phone 12 comprises an antenna 126. The antenna 126 allows communicating data, through an LR RF link(s) 15, over several mobile radio-communication networks 16, with a Remote Provisioning System (or RPS), as the server 18.

The phone 12 includes data processing means, such as one microprocessor (not represented), data storing means (not represented), as phone memory, and one or several Input/Output (or I/O) interfaces that are linked all together through a control and data bus (not represented).

The phone 12 plays, in a preferential manner, a role of a modulator-demodulator (or modem), so as to exchange data with the server 18.

The phone 12 carries out the following operations:
a modulation of an analogical carrier signal to encode digital information to be transmitted, over the antenna 126, to the server 18 (and/or another entity (not represented)), and
a demodulation of a received analogical carrier signal to decode the encoded digital information that is received, over the antenna 126, from the server 18 (and/or another entity (not represented)).

The phone memory may comprise one or several memories including one or several volatile memories and one or several non-volatile memories.

A phone memory, be it either volatile or non volatile, stores, at least in a temporary manner, data relating to a subscription which the phone 12 receives from the chip 14.

The phone 12 may include, as volatile memory, a cache memory.

The phone memory stores an Operating System (or OS) and one or several applications.

The phone 12 is preferably coupled to the chip 14.

The phone I/O interfaces include an I/O interface for exchanging data with the chip 14.

The chip 14 is under control of the phone microprocessor.

Alternately, instead of being coupled to the chip 14, the phone memory(ies) stores data stored within the chip 14 as described infra.

According to a particular embodiment, the chip 14 is soldered to a Printed Circuit Board (or PCB) of the phone 12.

According to another embodiment, the phone I/O interface with the chip 14 is an International Organization for Standardization (or ISO) 7816 interface, as contact interface, when the chip 14 is inserted, in a removable manner, within the phone 12.

Alternately, instead of a contact interface, the phone I/O interface with the chip 14 is connected to or includes a contact-less interface. The phone 12 is connected to or includes means for communicating data while using preferably a Short Range (or SR) RF link. The SR RF link may be related to any technology that allows the phone 12 to exchange data with the chip 14. The SR RF may be fixed at 13.56 MHz and related to a Near Field Communication (or NFC) type technology, as a contact-less technology.

The chip 14 is preferably associated with or tied to the server 18.

The chip 14 belongs to a user, as subscriber to a wireless service(s).

The chip 14 is connected, through a bi-directional link 13, to the phone 12.

The chip 14 includes a microprocessor(s) 142, as data processing means, a memory(ies) 144, as data storing means, and one or several I/O interfaces 146 that are internally all connected, through an internal bidirectional data bus 143, to each other.

The I/O interface(s) 146 allow communicating data from the internal chip components to the chip exterior and conversely.

The memory 144 stores preferably data relating to a Uniform Resource Identifier (or URI), a Uniform Resource Locator (or URL) and/or an Internet Protocol (or IP) address of an external entity to be addressed, like the server 18.

The memory 144 stores an OS.

The memory 144 stores preferably one or several Subscriber Identity Module (or SIM) type applications.

The SIM type application(s) includes, among others, a SIM application for a Global Service for Mobiles (or GSM) type network, a Universal Subscriber Identity Module (or USIM) application for a Universal Mobile Telecommunications System (or UMTS) type network, a Code Division Multiple Access (or CDMA) Subscriber Identity Module (or CSIM) application and/or an Internet protocol Multimedia Subsystem (or IMS) Subscriber Identity Module (or ISIM) application.

The SIM type application(s) allow(s) the phone 12 to authenticate to one or several mobile radio-communication networks 16.

To authenticate to the mobile radio-communication network(s) 16, the SIM type application(s) use(s) preferentially a network authentication key Ki relating to a current active subscription. The SIM type application(s) also use(s) preferably data, as a challenge that is supplied by an external entity that attempts to authenticate the subscriber, and an authentication algorithm, like, for instance, Milenage.

The memory 144 stores one or several additional applications. Among the supported applications, the memory 144 stores an invention application termed subscription manager.

The subscription manager allows carrying out a subscription switch function at the chip 14 level and at the phone 12 level, so as to store data relating to one and the same subscription after a subscription switch. The subscription manager allows ensuring a mobile radio-communication network connectivity after such a subscription switch without involving the terminal user.

The memory 144 stores data relating to a plurality of subscriptions to one or several mobile radio-communication networks 16, as a wireless service(s).

Each set of data relating to one subscription to one or several mobile radio-communication networks 16 includes:
an International Mobile Subscriber Identity (or IMSI), as a subscriber and a service subscription identifier for accessing a mobile radio-communication network;
a key Ki, as a network authentication key, allowing to authenticate the concerned subscriber to the concerned mobile radio-communication network;
Milenage, as an authentication algorithm, allowing to authenticate the concerned subscriber to the concerned mobile radio-communication network;
one or several passwords, like a Personal Identity Number (or PIN), and/or one or several cryptographic algorithm(s), as data relating to secret(s), that is(are) securely stored within the chip 14;
a file system including at least one Elementary File (or EF);
one or several security keys, like a key(s) for encrypting/decrypting data and/or a key(s) for signing data a key(s);
one or several applicative keys, like a key for accessing a user bank account through the mobile radio-communication networks; and/or
one or several credentials, like a user name and/or an IDentifier (or ID) of the subscriber, as data relating to the user.

For sake of simplicity, the memory 144 stores, for instance, only two sets of subscription data, one set of data relating to a first subscription, as "subscription 1", and another set of data relating to a second subscription, as "subscription 2".

However, the memory 144 may store more than two sets of subscription data and the invention is still applicable.

Two subscriptions are available, at the client side, within one and the same chip 14.

The memory 144 stores within a first security domain 145, as a first memory area, the first set of data relating to a first subscription.

The first subscription data set allows accessing from the phone 12 a first mobile radio-communication network 161.

The first subscription "subscription 1" is active, i.e. is in an enabled state.

The first subscription data comprises an identifier IMSI1, as a first subscriber, relating to a first subscription.

The first subscription data includes preferably a first key Ki1, as a first network authentication key Ki1, for authenticating the subscriber to the first mobile radio-communication network 161. The first network authentication key Ki1 is associated with the first subscriber IMSI1. The first network authentication key Ki1 allows authenticating the associated first subscriber to the first mobile radio-communication network 161.

The first security domain 145 may further store one or several applications that are accessible with a Mobile Network Operator (or MNO) that operates or lets operate the first mobile radio-communication network 161.

The memory 144 also stores, within a second security domain 147, as a second memory area, the second set of data relating to a second subscription.

The second subscription data set allows accessing from the phone 12 the second mobile radio-communication network 162.

The second subscription "subscription 2" is non-active, i.e. is in a disabled state.

The second subscription data comprises an identifier IMSI2, as a second subscriber, relating to a second subscription.

The second subscription data includes preferably a second key Ki2, as a second network authentication key Ki2, for authenticating the subscriber to a second mobile radio-communication network 162. The second network authentication key Ki2 is associated with the second subscriber IMSI2. The second network authentication key Ki2 allows authenticating the associated second subscriber to the second mobile radio-communication network 162.

The second security domain 147 may further store one or several applications that are accessible with an MNO that operates or lets operate the second mobile radio-communication network 162.

A particular subscription may be identified by one or several identifiers, like a subscriber identifier IMSI, an identifier relating to an application, also termed Application IDentifier (or AID), a Security Domain Subscription Issuer (or SDSI) and/or an identifier(s) relating to any software or hardware entity(ies) that is(are) involved within a communication path to access the concerned subscription information.

The microprocessor 142 processes, controls and communicates internally data with all the other components incorporated within the chip and, through the I/O interface(s) 146, with the chip exterior.

The microprocessor 142 executes or runs one or several applications including the subscription manager.

The microprocessor 142 is preferably able to initiate actions, in order to interact directly with the outside world, in an independent manner of the phone 12, as a chip host device. Such a capacity of interaction at the initiative of the chip 14 is also known as proactive capacity. According to one preferred embodiment, the chip 14 is able to use SIM ToolKit (or STK) type commands, as proactive commands.

The chip 14 is thus able to send, at its own initiative, through the phone 12, to any device connected to the phone 12 a proactive command for sending to the server 18 a message like a Short Message Service (or SMS) type message, for instance, an acknowledgement of receipt of a request for switching to an identified subscription, as a subscription to be activated.

The chip 14 is preferably able to authenticate its interlocutor as being the server 18 or another entity which the chip 14 is allowed to communicate with.

According to the invention, the subscription manager is adapted to receive a request for switching to the second subscription, as a subscription to be activated.

The subscription manager is preferably arranged to analyze whether all required data originating from an external entity is correct.

To carry out such a data analysis, the subscription manager checks preferably:
  the data length;
  whether the (identified) subscription to be activated, as a subscription data set, is effectively stored within the chip 14. If the subscription to be activated is not on-board, then the subscription manager may request an external entity, like the server 18, to load the corresponding missing subscription data set. Then, once the concerned subscription data set is effectively stored within the chip 14, the subscription manager may launch a switch to the subscription to be activated;
  whether there is or are missing one or several parameters for switching to the subscription to be activated; and/or
  other data feature(s) allowing to carry out a proper switch to the subscription to be activated.

If the data analysis fails, then the subscription manager may send back to a sender of a subscription switch request a message including an alert for informing of a failure relating to an execution of the requested subscription switch.

Once the data analysis is successful, the subscription manager uses a first variable relating to a next active subscription.

According to an essential invention feature, the subscription manager is adapted to set the first variable to the second subscription that is to be activated.

The subscription manager is adapted to send to the phone 12 OS a message for requesting the phone 12 OS to read data. Thus, the chip 14 forces the phone 12 to get data to be updated and that includes the data relating to the second subscription after an internal subscription switch.

The subscription manager is adapted, on the one hand, to de-activate, based on the first variable value, the first subscription and, on the other hand, to activate, based on the first variable value, the second subscription.

Thus, the subscription manager changes all data relating to a subscription that is to be activated, so as to activate the second subscription. Such a change applies to each Elementary File (or EF) that manages the data relating to a subscription that is to be active.

Once the internal subscription switch is carried out, the subscription manager is further adapted to provision, preferably after a phone request through a chip reboot or reset, the phone 12 OS with data relating to the second subscription, as a current active subscription.

Thus, the phone 12 updates its memory that stores the data relating to the current active subscription while replacing it with the provided data relating to the second subscription. A memory, like a volatile memory, such as a cache memory, of the phone 12 stores the data relating to the second subscription. The phone 12 and the chip 14 save both one and the same second set of data relating to the second subscription, as the current active subscription. There is no possible discrepancy between the phone 12 and the chip 14, as to the current active subscription. The phone 12 is informed of the lastly activated subscription to take into account a corresponding content, namely all data that allows accessing, instead of the first mobile radio-communication network 161, the concerned second mobile radio-communication network 162.

Once the subscription switch is carried out, the subscription manager may set the first variable to, e.g. zero, as a predetermined default value and a non-defined state.

Optionally, once the subscription switch is carried out, the subscription manager also uses a second variable relating to a current active subscription. The subscription manager sets the second variable to the second subscription that is activated.

The microprocessor 142 executes, in a preferred manner, one or several security functions.

The security functions include preferably a user authentication process to be used prior to continuing to access the memory 144. To authenticate the user, the user has to provide a PIN or biometric data, as user reference data, that is securely stored within the memory 144. As biometric data, it may include one or several fingerprints, one or several iris prints, one or several voiceprints relating to one or several authorized users.

The mobile radio-communication networks 16 is(are) connected, through a bi-directional wired link 17, to the server 18, as an OTA platform and back-end server.

The server 18 is identified by a URI, like an URL, or an IP address, as server identifier.

The server identifier may be stored within the chip memory 144 or a phone memory.

The server 18 may be operated by a mobile radio-communication network operator, as an MNO or a Mobile Virtual Network Operator (or MVNO), a service provider or on its behalf.

The server 18 is hosted by a computer.

The server 18 is dedicated to running an application for managing a database and communicating some information of the database to outside.

Alternately, another server (not represented) that is connected to the server 18 manages the database.

The server 18 includes preferably a memory 182 that stores the database. Instead of an internal memory, the server 18 is connected to an external memory (not represented) storing the database.

The database contains a set of one or several identifiers relating, each, to an individual client that is, each, associated with a lastly requested subscription switch to a subscription to be activated.

For sake of simplicity, the represented database registers data relating to only one client, the chip 14 (not represented), that is associated with a lastly requested switch to the second subscription "switch to subscription 2".

Figure 2:
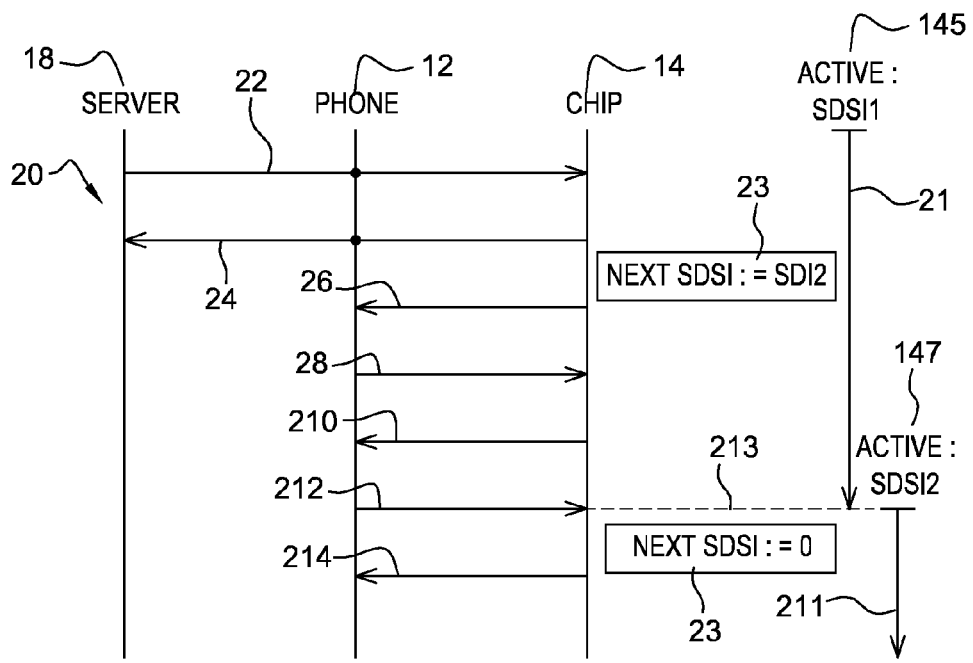
FIG. 2 represents an example of one message flow between the server and the distinct entities of the terminal equipment of FIG. 1, so that a subscription manager supported by a chip hosted by the terminal controls a data exchange with the terminal, so as to share the data relating to a subscription that is active after a subscription switch.

FIG. 2 depicts an exemplary embodiment of a message flow 20 that involves the phone 12, the chip 14 and the server 18. An exchange of messages between the phone 12 and the chip 14 causes a configuration of the phone 12.

In the explained example, it is assumed that the phone 12 is coupled to the chip 14, as a third device, which stores a first set of data relating to a first subscription "subscription 1" to be deactivated and a second set of data relating to a second subscription "subscription 2" to be activated.

It is assumed that only one subscription is active at a given time and that the first subscription "subscription 1" is active at the chip 14 and at the phone 12 prior to a subscription switch.

It is schematically represented the secure domain relating to the subscription that is active at a given time during a first time period 21.

Advantageously, the server 18 or another entity connected to the phone 12 and relating to the first mobile radio-communication network 161 authenticates successfully the chip 14 by using the first authentication key Ki 1 and the associated first subscriber IMSI1.

The server 18 sends to a subscription manager supported by the chip 14 a message 22, such as a so-termed "SMS-Point to Point (or PP) type envelope", including a command "SET Status", as a request for switching to a subscription (to be identified), that is accompanied with one or several identifiers relating to the second subscription to be activated, like the AID 2 and/or IMSI 2.

The server 18 thus requests the chip 14 to switch internally to the second subscription.

The chip 14, more exactly the subscription manager, analyses preferably data included within the received message and checks that all data originating from the server 18, namely e.g. an existence of the subscription to be switched internally, are correct.

Optionally, the chip 14 sends back to the server 18 an SMS type message 24 including a "Proof of Receipt" (or PoR), as an acknowledgement of receipt of the request for switching to an identified subscription, as a subscription to be activated. The acknowledgement of receipt of the request for switching to an identified subscription may be further accompanied with a result of the data analysis, like an execution status relating to a success or failure of the data analysis.

Instead of exchanging data by using an SMS type message, the server 18 and the chip 14 may exchange data by using an HyperText Transfer Protocol (or HTTP) type protocol or HyperText Transfer Protocol Secure (or HTTPS) type protocol.

The subscription manager includes a first variable 23 relating to a next active subscription.

According to the invention, the subscription manager sets the first variable 23 to the second subscription "subscription 2" that is identified by its corresponding SDSI, namely "SDSI2".

Once the first variable is updated after a receipt of a request to switch to the second subscription to be activated, the subscription manager sends to the phone 12 OS data 26, such as a "91XX" and an STK type command, as a message for requesting the phone 12 OS to read data. The STK type command "91XX" means that the chip 14 has some piece of data available to the phone 12 with a length equal to "XX" in hexadecimal.

When the phone 12 has received and interpreted the data 26 sent by the chip 14, the phone 12 sends to the chip 14 a command 28, such as "FETCH", as an STK type command, for receiving data.

Once the chip 14 receives from the phone 12 the command for receiving data, the subscription manager sends (through the chip OS) to the phone 12 OS a Refresh command in a UICC reset mode, as a STK type command and a message 210 for requesting the phone 12 OS to re-launch an execution of the subscription manager and to read data.

As far as the chip 14 is not restarted, the first subscription remains active at the chip 14 level.

The phone 12 sends to the subscription manager a message 212 including a reset command. Such a reset command allows re-launching an execution of the subscription manager and reading all the files stored within the chip memory 144.

Optionally, the subscription manager requests a phone user to authenticate.

To authenticate, the user has to provide a PIN or biometric data, as user reference data, that is securely stored within the memory 144. Otherwise, the subscription manager is not re-launched.

Once the phone 12 resets the chip 14 and after a preferable successful user authentication, the subscription manager is re-launched.

The subscription manager reads the first variable value. If the first variable value is defined as being a next active subscription, then the subscription manager has a subscription switch operation to carry out.

The subscription manager de-activates, based on the first variable value, the first subscription. To de-activate a subscription(s), the subscription manager compares the first variable value to each of the subscription that is present within the chip 14 and, if the subscription does not match the second subscription, then the subscription manager disables the concerned subscription.

Up to a de-activation of the first subscription, the first subscription is active and the corresponding first secure domain "SDSI1" 145 is active during the first time period 21.

Just after such a first subscription de-activation, there is, in a temporary manner, no subscription that is active.

Then, the subscription manager activates, based on the first variable value, the second subscription. To activate a subscription, the subscription manager compares the first variable value to each of the subscription that is present within the chip 14 and, if the subscription does match the second subscription, then the subscription manager enables the concerned subscription. If the previous active subscription is not the enabled subscription, then the subscription manager changes the enabled subscription.

At the time 213 of the activation of the second subscription, the second subscription is active and the corresponding second secure domain "SDSI2" 147 is active during a second time period 211. The second time period 211 is valid until a next subscription switch.

Optionally, the subscription manager sets the first variable to, e.g. zero, as a non-defined state.

Once the second subscription is active, the subscription manager sends to the phone 12 OS an Answer to Reset accompanied with data 214 relating to the second subscription, as a current active subscription.

Up to the transmission, to the phone 12, of the data 214 relating to the second subscription, the phone 12 does not store within its memory at least in a temporary manner, like a cache memory, the second subscription.

Once the second subscription is received, the phone 12 OS updates its memory at least in a temporary manner while duplicating the second set of data relating to the second subscription.

Once provisioned by the subscription manager, the phone 12 stores the data relating to the second subscription that constitutes a copy of the data relating to the subscription which the subscription manager has just switched to.

Thus, the configuration of the phone 12 allows to access, after a subscription switch within the chip 14, a second set of data relating to a second subscription to be also active at the phone 12 side.

The server 18 or another entity connected to the phone 12 and relating to the second mobile radio-communication network 162 authenticates successfully the chip 14 by using the second network authentication key Ki 2 that is associated with the second subscriber IMSI2.

The invention solution allows changing at the terminal level, after a subscription switch at the subscription manager level, the active subscription without needing to involve a phone user, except for submitting user authentication data, when applicable.

The invention solution is transparent to the user, apart from a possible user authentication operation.

The invention solution may be secure while authenticating the terminal equipment user and/or exchanging data in a confidential manner.

The embodiment that has just been described is not intended to limit the scope of the concerned invention. Other embodiments may be given. As another embodiment example, instead of exchanging with a remote server, the subscription manager exchanges, over a contact or contactless link, with a local entity, like another terminal.

The invention claimed is:

1. A method for accessing a service,
   wherein, a first device comprising a chip, the chip data storing means, the data storing means storing at least two subscriptions, a first subscription being active, at least one second subscription being non-active, the data storing means storing a subscription manager,
   the method includes the following steps:
   receiving by the subscription manager a request for switching to the second subscription, as a subscription to be activated;
   the subscription manager including a first variable relating to a next active subscription, setting by the subscription manager the first variable to the second subscription;
   sending by the subscription manager to the first device operating system a message for requesting the first device operating system to re-launch an execution of the subscription manager and to read data;
   receiving by the subscription manager from the first device operating system a message including a command for re-launching an execution of the subscription manager;
   de-activating by the subscription manager, based upon the first variable value, the first subscription;
   activating by the subscription manager, based upon the first variable value, the second subscription; and
   sending by the subscription manager to the first device operating system data relating to the second subscription, as a current active subscription.

2. Method according to claim 1, wherein, prior to sending to the first device operating system data relating to the second subscription, the subscription manager sets the first variable to a non-defined state.

3. Method according to claim 1, wherein the subscription manager exchanges data by using an HTTP or HTTPS type protocol.

4. Method according to claim 1, wherein the request for switching to the second subscription includes a command SET Status accompanied with at least one identifier relating to the second subscription to be activated.

5. Method according to claim 1, wherein the first device operating system and the subscription manager exchange data by using SIM ToolKit type commands.

6. Method according to claim 5, wherein the message for requesting the first device operating system to re-launch an execution of the subscription manager and to read data includes a Refresh command in a UICC reset mode.

7. Method according to claim 5, wherein the subscription manager sends to the first device operating system an Answer to Reset accompanied with the data relating to the second subscription, as the current active subscription.

8. A first device for accessing a service,
wherein, the first device comprising a chip, the chip comprising data storing means, the data storing means storing a subscription manager, the data storing means storing at least two subscriptions, a first subscription being active, at least one second subscription being non-active, the subscription manager being able to receive a request for switching to the second subscription, as a subscription to be activated the subscription manager including a first variable relating to a next active subscription, the subscription manager is configured to:
set the first variable to the second subscription;
send to the first device operating system a message for requesting the first device operating system to re-launch an execution of the subscription manager and to read data;
receive a message including a command for re-launching an execution of the subscription manager;
de-activate, based upon the first variable value, the first subscription;
activate, based upon the first variable value, the second subscription; and
send to the first device operating system data relating to the second subscription, as a current active subscription.

9. First device according to claim 8, wherein the chip is fixed to the first device.

10. First device according to claim 8, wherein the chip is removable from the first device.

* * * * *

UNITED STATES PATENT AND TRADEMARK OFFICE
CERTIFICATE OF CORRECTION

| | |
|---|---|
| PATENT NO. | : 9,615,244 B2 |
| APPLICATION NO. | : 15/107412 |
| DATED | : April 4, 2017 |
| INVENTOR(S) | : Nicolas Roussel et al. |

Page 1 of 1

It is certified that error appears in the above-identified patent and that said Letters Patent is hereby corrected as shown below:

Claim 1, Line 2, after "chip" (second occurrence), insert --comprising--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*